United States Patent
Hong

(10) Patent No.: US 7,227,533 B2
(45) Date of Patent: Jun. 5, 2007

(54) HEIGHT ADJUSTABLE COMPUTER INPUT DEVICE

(75) Inventor: Jing-Qing Hong, Taipei (TW)

(73) Assignee: Kye Systems Corp., Taipei (TW)

( * ) Notice: Subject to any disclaimer, the term of this patent is extended or adjusted under 35 U.S.C. 154(b) by 511 days.

(21) Appl. No.: 10/739,102

(22) Filed: Dec. 19, 2003

(65) Prior Publication Data

US 2005/0134565 A1 Jun. 23, 2005

(51) Int. Cl.
*G09G 5/00* (2006.01)
(52) U.S. Cl. .................................. 345/163; 345/184
(58) Field of Classification Search ......... 345/156–184
See application file for complete search history.

(56) References Cited

U.S. PATENT DOCUMENTS 5,260,696 A * 11/1993 Maynard, Jr. ............... 345/163
6,486,873 B1 * 11/2002 McDonough et al. ........ 345/163

FOREIGN PATENT DOCUMENTS

JP          03055622 A    * 3/1991
WO    WO 2004086216 A1  * 10/2004

* cited by examiner

*Primary Examiner*—Alexander Eisen
(74) *Attorney, Agent, or Firm*—Bacon & Thomas, PLLC

(57) ABSTRACT

An adjustable computer input device includes a body having a recess for adjustable receiving a supporting unit. A user can adjust a height the supporting unit relative to body so that the supporting unit more comfortably fits the user's hand.

12 Claims, 5 Drawing Sheets

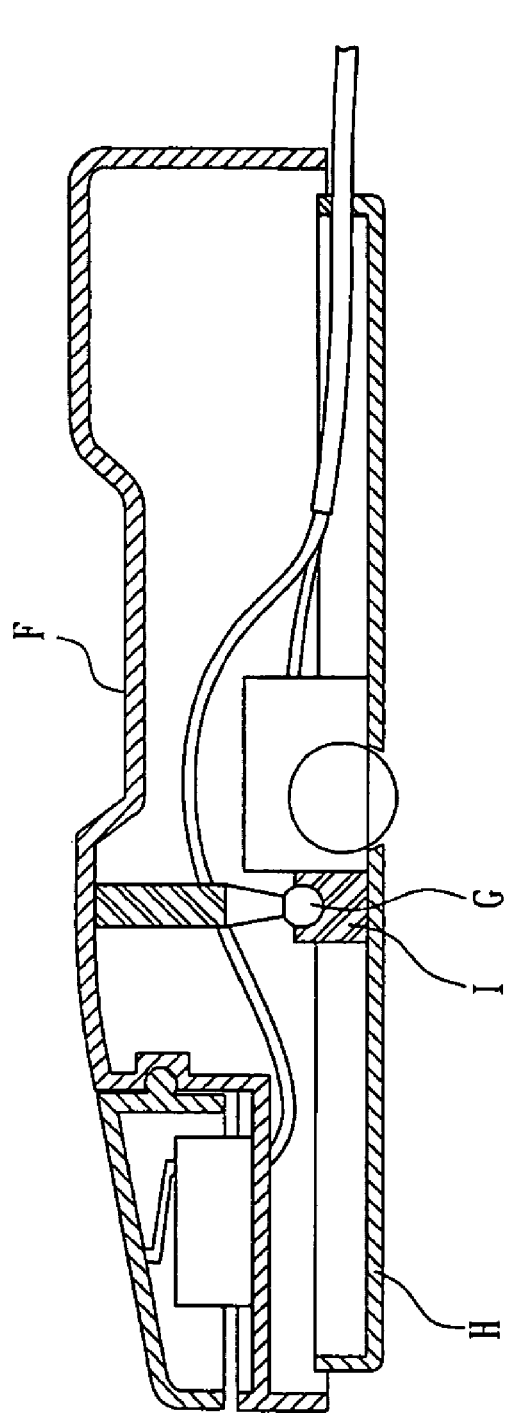
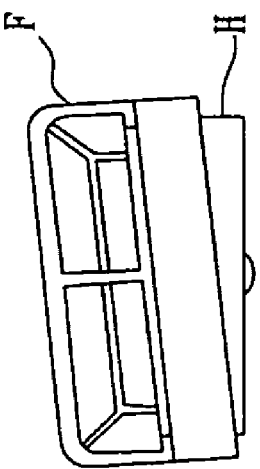
FIG. 2A
(Prior Art)
FIG. 2B
(Prior Art)

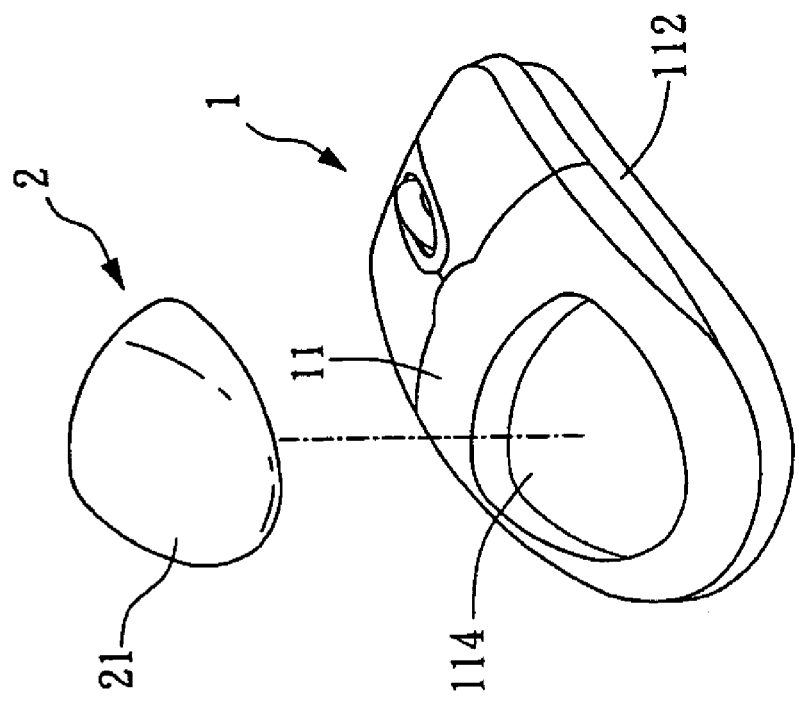
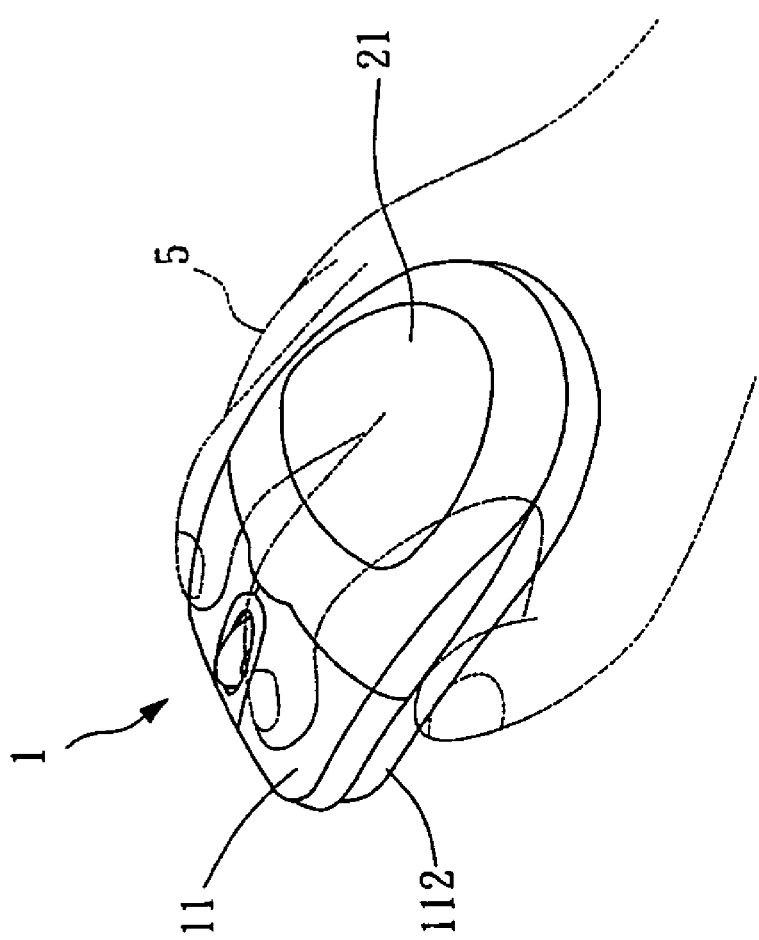
FIG. 4A
FIG. 4B

HEIGHT ADJUSTABLE COMPUTER INPUT DEVICE

BACKGROUND OF THE INVENTION

1. Field of the Invention

The present invention relates to a computer input device, and in particular to a height-adjustable input device for supporting a user's hand.

2. Description of the Prior Art

Due to advances in technology, one almost cannot live without connecting to a computer. Unfortunately, frequent use of a computer input device can cause various injuries to the user's back, neck, shoulder, elbow, wrist or finger. As a result, a number of so-called "ergonomic designs" have been developed to avoid injuries such as Repetitive Strain Injury (RSI) or Cumulative Trauma Disorders (CTD).

FIG. 1 shows one such ergonomic design, disclosed in U.S. Pat. No. 6,229,527, in which the shape of body A is transformed by the pressing of a user's hand 5 such that the surface C can fully contact with hand 5. In addition, the button D can be randomly moved to a desired position on the body A, so as to be compatible with different palm sizes.

FIGS. 2A and 2B show another design, disclosed in U.S. Pat. No. 6,064,371, in which the upper housing F is pivotally coupled to lower housing H via a round support G contained in the recess 1. That design enables a user to move the upper housing F forward, backward, or to the left or right side.

However, neither of these known ergonomic designs can resolve the essential problem caused by the height of the input device relative to the plane of a working surface.

SUMMARY OF THE INVENTION

It is an object of the present invention to provide a computer input device, in which the height of the device may be adjusted relative to the plane of a working surface, thereby enabling a user to apply a proper grasping force to the input device and minimize stress on the user's back, neck, shoulder, elbow, wrist or finger.

To accomplish the virtues described above, the present invention includes a body having a recess for containing a supporting unit. A user can adjust the height of the supporting unit relative to the body so that the supporting unit fits and supports the user's hand perfectly.

BRIEF DESCRIPTION OF THE DRAWINGS

FIGS. 2A and 2B are side and rear views of another prior art input device.

FIGS. 4A and 4B are isometric views showing a second embodiment preferred embodiment of the present invention.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

Figure 1:
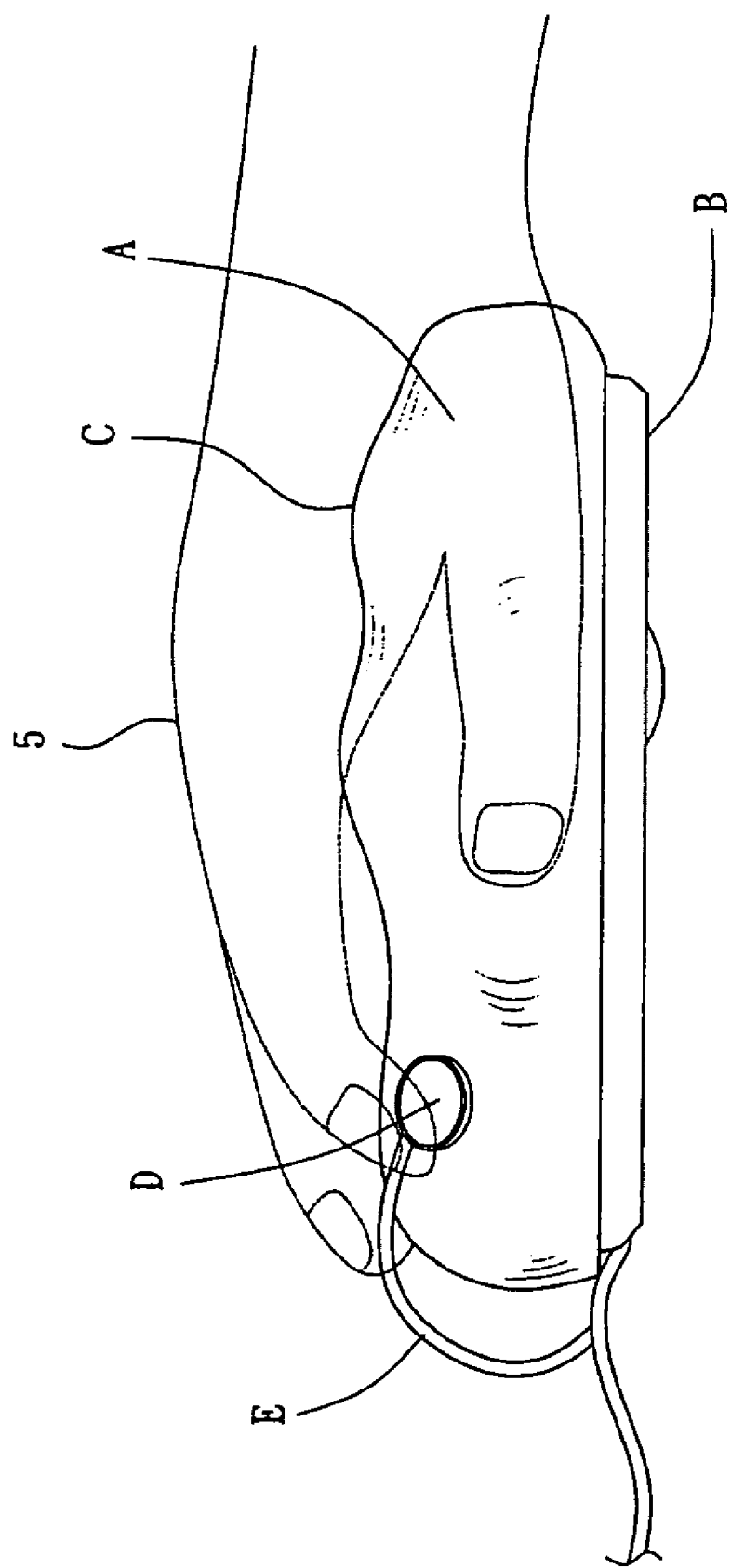
FIG. 1 is a side view of a prior art input device.
Figure 3A:
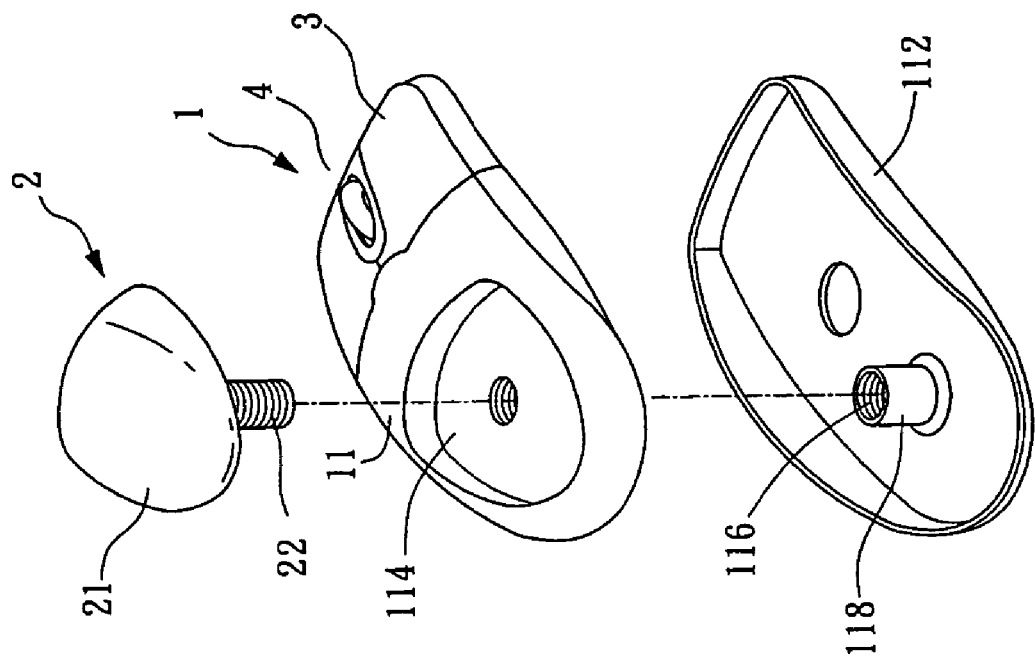
FIG. 3A is an exploded isometric view of an input device constructed in accordance with the principles of a first preferred embodiment of the present invention.
Figure 3B:
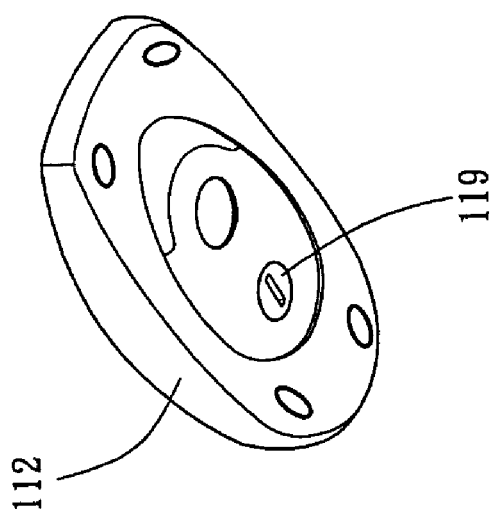
FIG. 3B is a isometric view showing the bottom of the input device of the first embodiment.

FIGS. 3A and 3B show the first preferred embodiment of the present invention. A computer input device, such a mouse 1, has a body 11 and a base 112 forming a hollow portion to contain various components. The body 11 has several buttons 3, a roller 4, and a recess 114. The base 112 also has a threaded member in the form, for example, or socket 118 with an internally threaded opening 116.

The input device has a supporting unit 2, which further has a surface 21 and a fixing portion in the form, for example, of a bolt 24 or similar threaded member extending from a bottom surface of the supporting unit. The socket 118 can be screwed onto the bolt 24 by rotating a knob 119. A user may rest his hand over the surface 21 to operate the mouse 1. If the height of the supporting unit 2 does not feel proper to the user, the user may rotate the knob 119 to adjust the height of the supporting unit 2. The socket 118 is secured to the base 112 and can only be turned when knob 119 is rotated by a user. Once the user turns the knob 119, the supporting unit 2 will eventually move upward or downward correspondingly.

FIGS. 4A and 4B show a second preferred embodiment of the present invention. In this embodiment, the user adjusts the height of the supporting unit by simply choosing a supporting unit 2 of appropriate thickness to be wedged into the recess 114 to thereby adjust or modulate the height of the supporting unit 2 relative to the body 11 so as to fit the user's hand 5 comfortably.

Figure 5A:
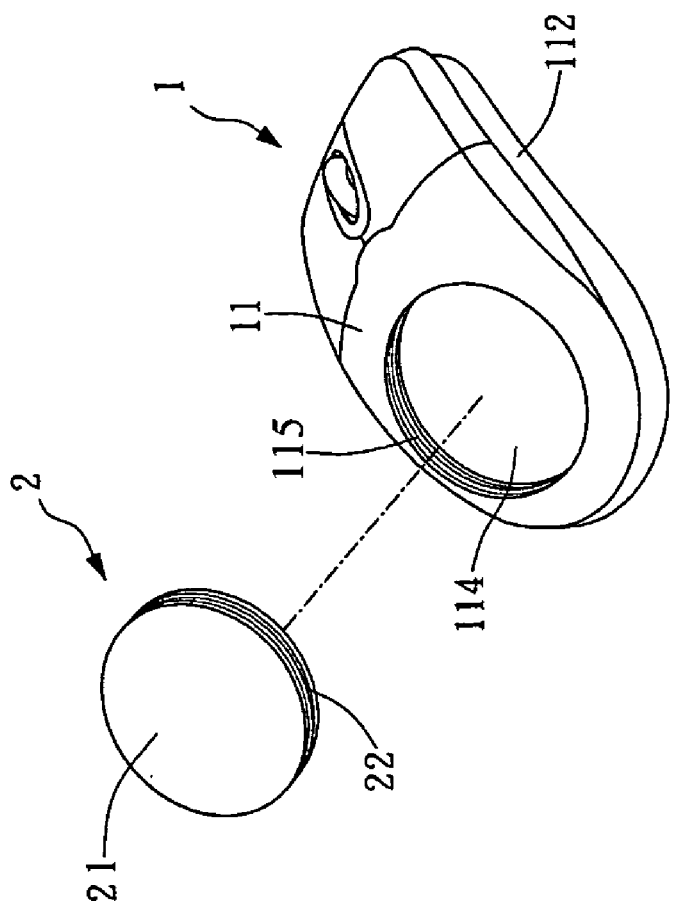
FIGS. 5A and 5B are isometric views showing a third preferred embodiment of the present invention.
Figure 5B:
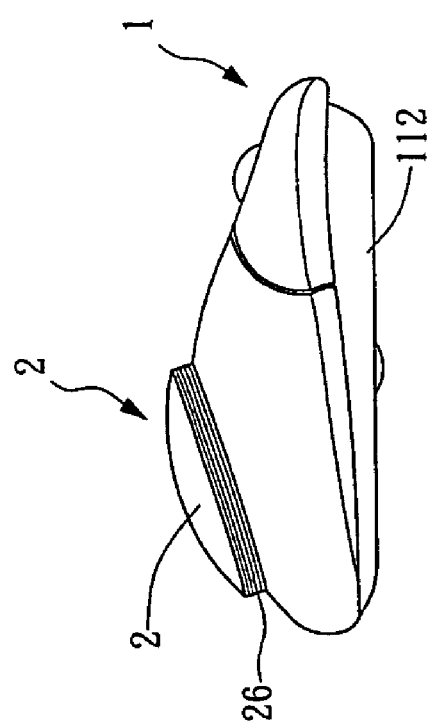

Referring to FIGS. 5A and 5B, in a third preferred embodiment of the present invention, the supporting unit 2 has a fixing portion in the form of an externally threaded portion 22, and the recess 114 has a corresponding internally threaded portion 115. Thus, the supporting unit 2 can be screwed into the recess 114. A user may adjust the height of the supporting unit 2 to the body 11 by rotating the supporting unit 2 to a desired position.

Those skilled in the art will appreciate that the supporting unit 2 can be made of various materials, such as plastic, metal, gel, rubber, etc. Also, the supporting unit 2 can be transparent, translucent, or even opaque. If a light source, such as a LED, is located within the body 11 and the supporting unit 2 is transparent or translucent, a logo, pattern, or text on the surface 21 will be illuminated as light is emitted by the light source. The light source can be an extra-added LED light, or an optical coordinate detecting module.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. An input device, comprising:
    a body having a recess and supporting at least one of a button and a roller engageable by a hand of a user of the input device; and
    a supporting unit positioned in the recess and arranged to support the hand of the user of the input device,
    wherein a position of the supporting unit in the recess is adjustable to vary a height of the supporting unit relative to the body and the at least one of a button and a roller.

2. The input device as claimed in claim 1, wherein the supporting unit is removably wedged into the recess and said height is adjustable by selecting supporting units of different thickness.

3. The input device as claimed in claim 1, wherein the supporting unit has a surface for supporting the user's hand, and a fixing portion for securing the supporting unit to the body.

4. The input device as claimed in claim 3, wherein the fixing portion is a threaded portion of the supporting unit, and the recess has a corresponding threaded portion such that a user can screw the supporting unit into the recess of the body, whereby the height of the supporting unit is adjusted by rotating the supporting unit.

5. The input device as claimed in claim 3, wherein the fixing portion is a bolt arranged to be screwed into a threaded opening of a socket on a base of the body.

6. The input device as claimed in claim 5, wherein a height of the supporting unit is adjusted by rotating the socket relative to the bolt.

7. The input device as claimed in claim 1, wherein a material of the supporting unit is selected from the group consisting of metal, plastic, gel, and rubber.

8. The input device as claimed in claim 7, wherein the supporting unit is transparent or translucent.

9. The input device as claimed in claim 1, wherein a logo, text or pattern is formed on the surface of the supporting unit.

10. The input device as claimed in claim 8, wherein the body has a light source to illuminate the supporting unit.

11. The input device as claimed in claim 10, wherein the light source is located in the recess.

12. The input device as claimed in claim 10, wherein a logo, text or pattern can be formed on the surface of the supporting unit.

* * * * *